W. C. CARTER & J. P. EMERY.
Improvement in Desks for School Teachers.
No. 5,107. Reissued Oct. 22, 1872.
Fig I
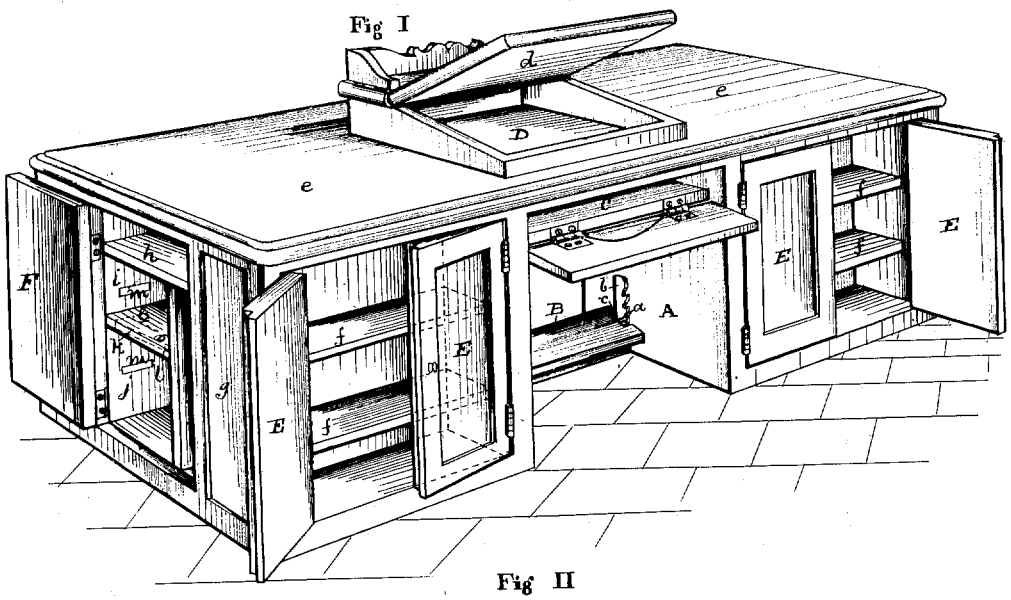
Fig II
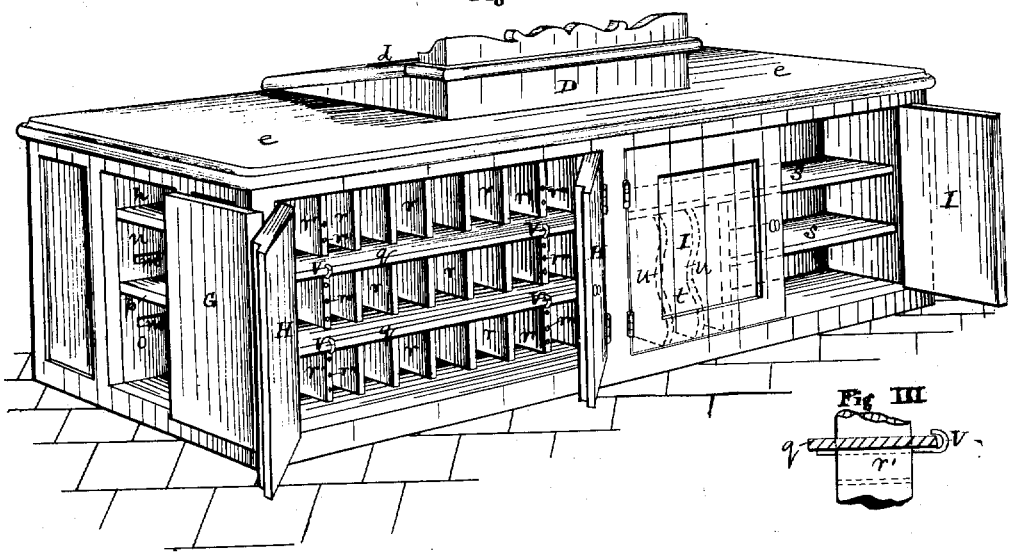
Fig III
WITNESSES
D. G. Stuart
Wm. G. Anderson
INVENTORS
Wesley C. Carter
and James P. Emery
by A. H. Ballard & W. B. Richards
Attys

UNITED STATES PATENT OFFICE.

WESLEY C. CARTER AND JAMES P. EMERY, OF GALVA, ILLINOIS, ASSIGNORS, BY MESNE ASSIGNMENTS, TO JAMES P. EMERY AND ALLEN F. MILLER.

IMPROVEMENT IN DESKS FOR SCHOOL-TEACHERS.

Specification forming part of Letters Patent No. 119,316, dated September 26, 1871; reissue No. 5,107, dated October 22, 1872.

*To all whom it may concern:*

Be it known that we, WESLEY C. CARTER and JAS. P. EMERY, of Galva, in the county of Henry and State of Illinois, have invented certain Improvements in Desks for Schools, &c., of which the following is a specification:

Our invention relates to improvements in desks for the use of teachers in schools, colleges, &c., constructed with compartments for all books, charts, maps, instruments, &c., usually employed, said compartments arranged for convenience to the occupant and to utilize space, and adjustable to be varied in size as occasion may require. The invention consists in the construction and arrangement of the desk and the various compartments, as hereinafter described. It also consists in the use of an adjustable foot-rest, and in new mechanisms for adjusting the several shelves of the desk.

In the accompanying drawing, Figure 1 is a perspective view of our improved desk looking at it from the front; Fig. 2 is a perspective view of the same looking at it from the back; and Fig. 3 is a sectional view of a portion of the adjustable shelves.

The desk shown in the drawing is represented as being of rectangular form, with a space or chamber, A, in front, for accommodating the lower extremities of the occupant. In the back portion of the chamber A is a foot-rest, B, which is a plate or board with projecting pins or trunnions *a* at the ends. The pins *a* rest in inclined notches in bars *b b* that are fastened to the sides of the chamber A. The foot-rest B may be adjusted in height in the notches in bars *b*, and may be held at any requisite inclination by a lip, *c*, at the back of board B, striking the back edge of the bar *b*, or by a similar lip in front striking the front edge of said bar. Directly above the space A is a compartment, C, with a hinged drop-door to close it. It serves as a receptacle for stationery, &c., and has the drop-door in preference to a drawer, as it is more convenient to the person sitting right in front. Above the compartment C is the writing-desk proper D, which has an incline hinged lid, *d*. The writing-desk D projects above the flat top *e* of the entire desk, and has thus horizontal planes on both sides of it and in rear for putting things aside, displaying instruments, &c. At the sides of the space A are doors E E inclosing cases, in which may be kept text-books or other articles within convenient reach of the teacher. Shelves *f f* are arranged in these cases at suitable distances apart, or they may be adjustable in distance, as hereinafter described, for other shelving. One end of the desk has a door, F, which closes four compartments, *g*, *h*, *i*, and *j*. The narrow upright compartment *g* may be used for the common style of charts stiff enough to stand therein on their edges. The narrow-top compartment *h* extends through the entire length of the desk, and may be used for large maps or other large surfaces. The compartment *i* may be used for sundries, and *j* for maps, &c. The shelf *k* between the compartments *i* and *j* can be adjusted higher or lower to permit the enlargement of either chamber. For this purpose two transverse supporting-bars, shown by dotted lines *l*, are pivoted to the under side of the shelf, so that their projecting ends will enter notches *m* provided in the sides of the compartment. Whenever the bars *l* are turned obliquely to the shelf their ends will come out of the notches *m* and permit the removal or adjustment of the shelf. Any or all of the shelves used in this desk can be made adjustable by the same means, except the shelves provided with partings, hereinafter described. The opposite end of the desk has a door, G, which closes three compartments, *h*, *n*, and *o*. The first compartment *h* has already been referred to as extending through from the opposite end of the desk. The compartment *n* may be used for slates, and the compartment *o* may be used for globes, tellurians, models, and other instruments or implements. The shelf *p*, between *n* and *o*, is adjustable in the same manner as the shelf *k*, above described. The back of the desk, as shown at Fig. 2, has two pairs of doors, H H and I I, leading to the library-cases. The case closed by the doors H H has adjustable shelves *q q* with partings *r r*. The partings *r r* are somewhat narrower than the shelves *q q*, and pass through transverse openings in said shelves, so that the shelves may be raised or lowered and their distances apart adjusted without removing the partings. Two of the partings, *r' r'*, are pierced with holes *r'' r''*, into which pins *v v* may be inserted, and their projecting ends serve as supports for the shelves *q q*. The doors I I lead to a case with plane shelves *s*, a portion of which, *t*, is set off for the day-book, ledger, and other large books, having vertical shelves *u* for hold them apart.

In this manner a compact desk is produced, which contains room for all ordinary school-room necessaries, with the different compartments so constructed and arranged as to furnish space for almost any article or any different kind of necessary which may be found in different schools and colleges, such spaces and compartments so constructed that their relative sizes may be adjusted and adapted to varying wants, and the whole so arranged as to be conveniently reached from every side.

Having thus described our invention, we claim as new, and desire to secure by Letters Patent—

*Claims.*

1. In combination with the desk, the foot-rest B, hung in the notched bars *b* to be adjustable therein, substantially as herein shown and described.

2. The adjustable shelf, provided with the pivoted supporting-bars *l l* whose ends fit into the notched sides of the compartment, as specified.

3. The adjustable shelves *q q*, constructed as described, and combined and arranged to operate with the partings *r r* and pins *v v*, substantially as described, and for the purpose specified.

4. The combination and arrangement of the parts A B C F G H I D *c h n o*, when provided with adjustable and removable shelving, substantially as described, and for the purpose specified.

WESLEY C. CARTER.
JAMES P. EMERY.

Witnesses:
C. A. SHURTLEFF,
SAMUEL LONEY.